US006981193B2

(12) United States Patent
Park

(10) Patent No.: US 6,981,193 B2
(45) Date of Patent: Dec. 27, 2005

(54) INTERNET TELEPHONE AND METHOD FOR RECOVERING VOICE DATA LOST THEREIN

(75) Inventor: Min Soo Park, Kunpo-shi (KR)

(73) Assignee: LG Electronics Inc., Seoul (KR)

( * ) Notice: Subject to any disclaimer, the term of this patent is extended or adjusted under 35 U.S.C. 154(b) by 863 days.

(21) Appl. No.: 09/898,123

(22) Filed: Jul. 3, 2001

(65) Prior Publication Data

US 2002/0059060 A1 May 16, 2002

(30) Foreign Application Priority Data

Nov. 10, 2000 (KR) ............................... 2000-66840

(51) Int. Cl.[7] .............................................. H04L 1/00
(52) U.S. Cl. .................................................. 714/747
(58) Field of Search ............................... 714/746, 747, 714/799; 370/352–355; 704/270.1

(56) References Cited

U.S. PATENT DOCUMENTS 6,549,886 B1 * 4/2003 Partalo .................... 704/270.1

FOREIGN PATENT DOCUMENTS

WO WO01/49005 A1 * 7/2001 ............ H04I 29/14

OTHER PUBLICATIONS

Figueiredo et al., efficient mechanisms for recovering voice packets in the internet, 1999, IEEE, Global Telecommunication COnference, p. 1830-1837.*

Goodman et al., waveform substitution techniques for recovering missing speech segments in packet voice communications, 1 1986, IEEE, Trans. on Acoustics, Speech & signal processing, vol. ASSP-34, No. 6, p. 14401448.*

Huang et al., Robust audio transmission over internet with self-adjusting buffer control, 2000, Information Science, www.elsevier.com/locate/ins, p. 1-28.*

* cited by examiner

*Primary Examiner*—Shelly Chase
(74) *Attorney, Agent, or Firm*—Lee, Hong, Degerman, Kang & Schmadeka

(57) ABSTRACT

The present invention relates to an internet telephone and a method for recovering voice data lost in the internet telephone. Whether there is any voice data lost in a voice data packet received via the internet network and the position information for a lost portion of the voice data is obtained. A voice data normally received previously to the lost portion is filled in the lost portion of the voice data. In making a telephone call using the internet, the speech quality is improved by correcting the lost voice signal.

20 Claims, 3 Drawing Sheets

| | | | | |
|---|---|---|---|---|
| IP header | UDP header | Data 1 | • • • • | Data n |

INTERNET TELEPHONE AND METHOD FOR RECOVERING VOICE DATA LOST THEREIN

BACKGROUND OF THE INVENTION

1. Field of the Invention

The present invention relates to an internet telephone, and more particularly, to an internet telephone for correcting loss of a voice signal and a method for recovering voice data lost in the internet telephone.

2. Description of the Related Art

In making a call using the internet, the processing of a voice signal will now be described in brief.

At a sending part, an analog voice signal is firstly converted into a digital signal and then it is compressed and encoded. This compressed and encoded voice signal is transmitted to a receiving part in the form of a voice data packet.

At the receiving part, the compressed and encoded voice data packet is restored to the original digital signal and then is converted into the analog signal. The analog signal is outputted via a speaker. An internet telephone makes a telephone call by the above-described method in general.

FIG. 1 is a diagram illustrating the construction of an internet telephone in accordance with the conventional art.

As illustrated therein, the conventional internet telephone can operate as the sending part and the receiving part.

An internet telephone 120 corresponding to the sending part compresses and encodes a voice signal of a caller and transmits it in the form of packet data via the internet network 105. An internet telephone 130 corresponding to the receiving part receives and restores the voice packet transmitted from the sending part via the internet network 105.

First, the internet telephone corresponding to the sending part includes a microphone 101 for receiving the voice of a caller to output an analog voice signal, an analog/digital converter(ADC) 102 for converting the analog voice signal outputted from the microphone into a digital voice signal, a voice encoder 103 for compressing and encoding the converted digital voice signal, and a protocol processor 104 for processing the compressed and encoded voice data according to an internet protocol to output it in the form of a voice data packet.

Meanwhile, the internet telephone corresponding to the receiving part includes a protocol processor 106 for receiving the voice data packet transmitted via the internet network 105 and separating the compressed and encoded voice data from the voice data packet, a voice decoder 107 for restoring the compressed and encoded voice data to the original voice digital signal, a digital/analog converter (DAC) 108 for converting the restored digital voice signal into the original analog voice signal and a speaker 109 for outputting the analog voice signal as the original voice of the caller.

The operation of the internet telephones thusly constructed according to the conventional art will now be described below.

When the voice of the caller is inputted into the microphone 101 of the sending part, the analog voice signal of the caller outputted from the microphone 101 is converted into a digital voice signal by the analog/digital converter 102.

The digital voice signal outputted from the analog/digital converter 102 is converted into compressed and encoded data through the voice encoder 103 in order to increase transmission efficiency. A header, trailer, etc. are added to the compressed and encoded voice data by the protocol processor 104.

Therefore, the protocol processor 104 outputs a voice data packet. The voice data packet is transmitted toward the internet telephone corresponding to the receiving part via the internet network 105.

The voice data packet transmitted via the internet network 105 is firstly inputted into the protocol processor 106 of the receiving part. The protocol processor 106 extracts the compressed and encoded voice data from the received voice data packet by removing added information such as the header and trailer.

The extracted compressed and encoded voice data is restored to the digital voice signal by the voice decoder 107. The digital voice signal is converted into the analog voice signal by the digital/analog converter 108.

The analog voice signal is inputted into the speaker 109 and the speaker 109 outputs the original voice of the caller.

The conventional internet telephone has the following problems.

When the voice data packet transmitted or received via the internet network is partially lost during transmission or in a signal processing process, the speech quality of a VOIP(voice over internet protocol) is drastically decreased.

In other words, in the case where the voice data packet is partially lost, at the receiving part, a blank is generated in the analog voice signal of the caller as much as the lost portion of the voice data packet, and, further, the voice of the caller outputted through the speaker of the receiving part is made discontinuous.

Accordingly, the speech quality of the VOIP is drastically decreased.

SUMMARY OF THE INVENTION

It is, therefore, an object of the present invention to provide an internet telephone capable of deciding whether or not a received voice data packet is lost.

It is another object of the present invention to provide an internet telephone capable of correcting loss of a voice data packet.

To achieve the above object, there is provided an internet telephone in accordance with the present invention which duplicates a normal data received previously to a lost portion and fills the duplicated normal data in the lost portion when a loss occurs on the voice data packet received via the internet network.

In accordance with a first embodiment of the present invention, the internet telephone firstly decides whether or not a voice data is lost on the previously received voice data packet.

The internet telephone duplicates the normal voice data received previously to the lost portion and fills the duplicated portion in the lost portion in order to correct the lost portion of the voice data.

The internet telephone performs a signal processing process for eliminating discontinuity generated at the boundary point between the original voice data and the duplicated voice data.

Accordingly, on the VOIP, the speech quality of a telephone call using the internet is improved.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will now be described with reference to FIGS. 2, 3*a* and 3*b*.

Figure 3:
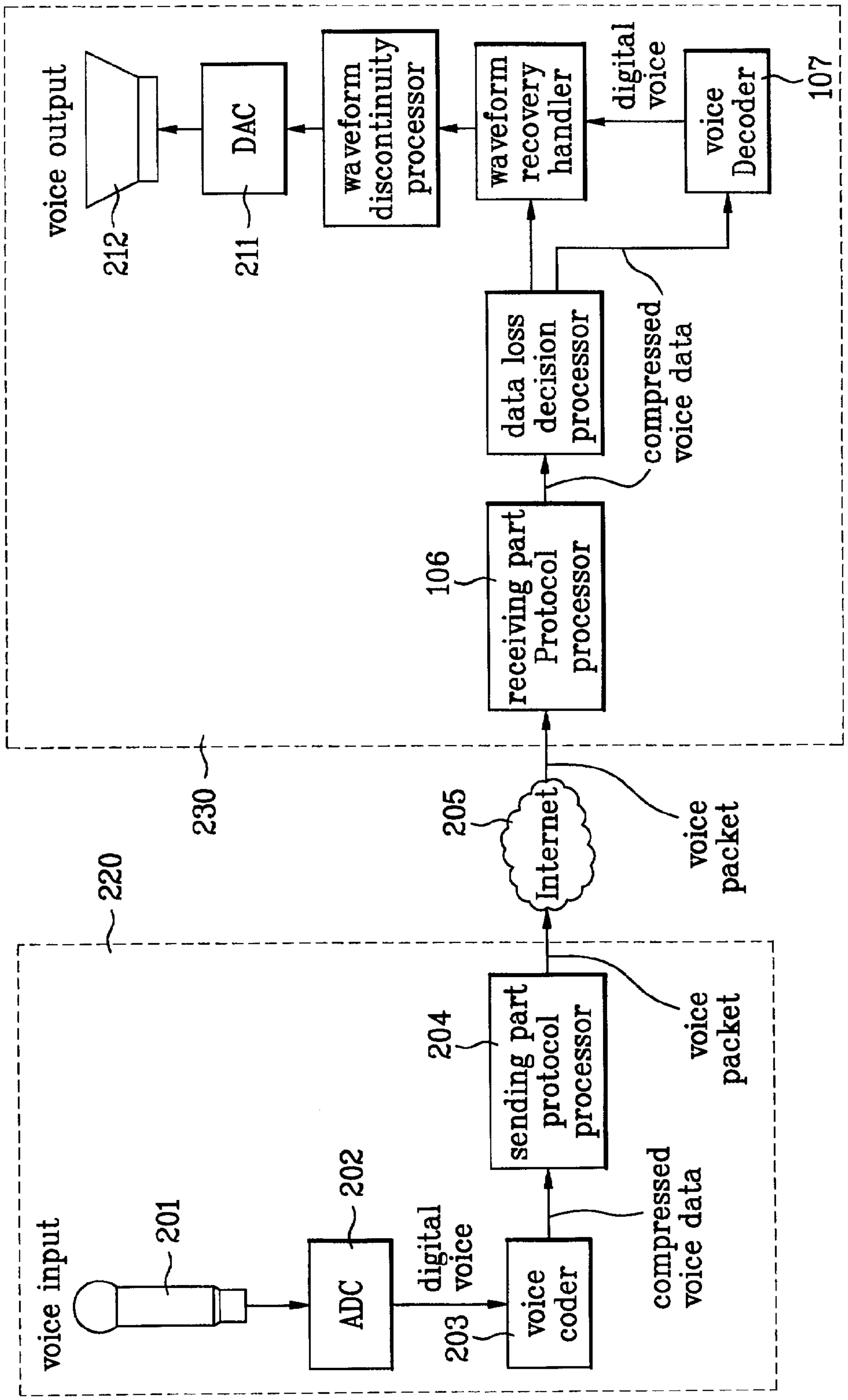
FIG. 3 is a block diagram illustrating the construction of an internet telephone in accordance with the present invention.

FIG. 3 is a block diagram illustrating the construction of an internet telephone 220 corresponding to a sending part and the construction of an internet telephone 230 corresponding to a receiving part.

In order to correct a lost portion of a voice data received via the internet network, the internet telephone 230 corresponding to the receiving part includes a data loss decision unit 207 for approximately deciding whether the voice data received via the internet network 205 is lost or not and outputting the position information for the lost portion of the voice data and a waveform recovery unit 209 for duplicating a normal voice data previous to the lost portion and filling the duplicated normal voice data in the lost portion according to the position information for the lost portion.

In addition, the internet telephone 230 further includes a waveform discontinuity handing unit 210 for removing discontinuity between the original voice data and the duplicated voice data in the voice data recovered by the waveform recovery unit 209 at the next stage of the waveform recovery unit 209.

Meanwhile, the waveform discontinuity handling unit 210 measures a discontinuous distance between the original voice data and the duplicated voice data based on the position information for the lost portion, and then readjusts values of voice samples so that the discontinuous distance can be reduced with respect to a predetermined number of voice data samples positioned previous to and next to the discontinuous distance.

The construction of another internet telephone in accordance with the present invention will now be described below in more detail.

As illustrated in FIG. 3, the internet telephone 220 corresponding to the sending part compresses and encodes a voice signal of the caller and transmits it to the internet telephone 230 corresponding to the receiving part via the internet network 205 in the form of a packet data.

The internet telephone 230 corresponding to the receiving part decides whether the voice data is lost or not on the voice data received via the internet network 205 and properly corrects the lost portion of the voice data according to the result of the decision.

FIG. 3 illustrates those two internet telephones 220 and 230 corresponding to the receiving part and sending part for convenience. Actually, each internet telephone has all the functions corresponding to both internet telephone of the receiving part and internet telephone of the sending part.

The internet telephone 220 corresponding to the receiving part includes a microphone 201 for receiving the voice of a caller to output an analog voice signal, an analog/digital converter(ADC) 202 for converting the analog voice signal outputted from the microphone into a digital voice signal, a voice encoder 203 for compressing and encoding the digital voice signal, and a protocol processor 204 for outputting the compressed and encoded voice data as a voice data packet conforming to the protocol for the internet network 205.

The internet telephone 230 corresponding to the receiving part includes a protocol processor 206 for separating the compressed and encoded voice data from the voice data packet transmitted via the internet network 205, a data loss decision unit 207 for deciding whether the voice data is lost or not by analyzing the compressed and encoded data and for outputting the position information for the lost portion of the voice data if the voice data is lost, a voice decoder 208 for restoring the compressed and encoded voice data having passed the data loss decision unit 207 to the digital voice data, a waveform recovery handing unit 209 for performing waveform recovery for the lost portion by filling the duplicated previous normal voice data in the lost portion of the restored digital voice data based on the position information, a waveform discontinuity handling unit 210 for removing waveform discontinuity between the original voice data and the duplicated previous normal voice data in the recovered voice data, a digital/analog converter(DAC) 211 for converting the digital voice signal outputted from the waveform discontinuity handling unit 210 into the analog voice signal, and a speaker 211 for inputting the analog voice signal and outputting the voice of the caller.

Figures 1, 2:
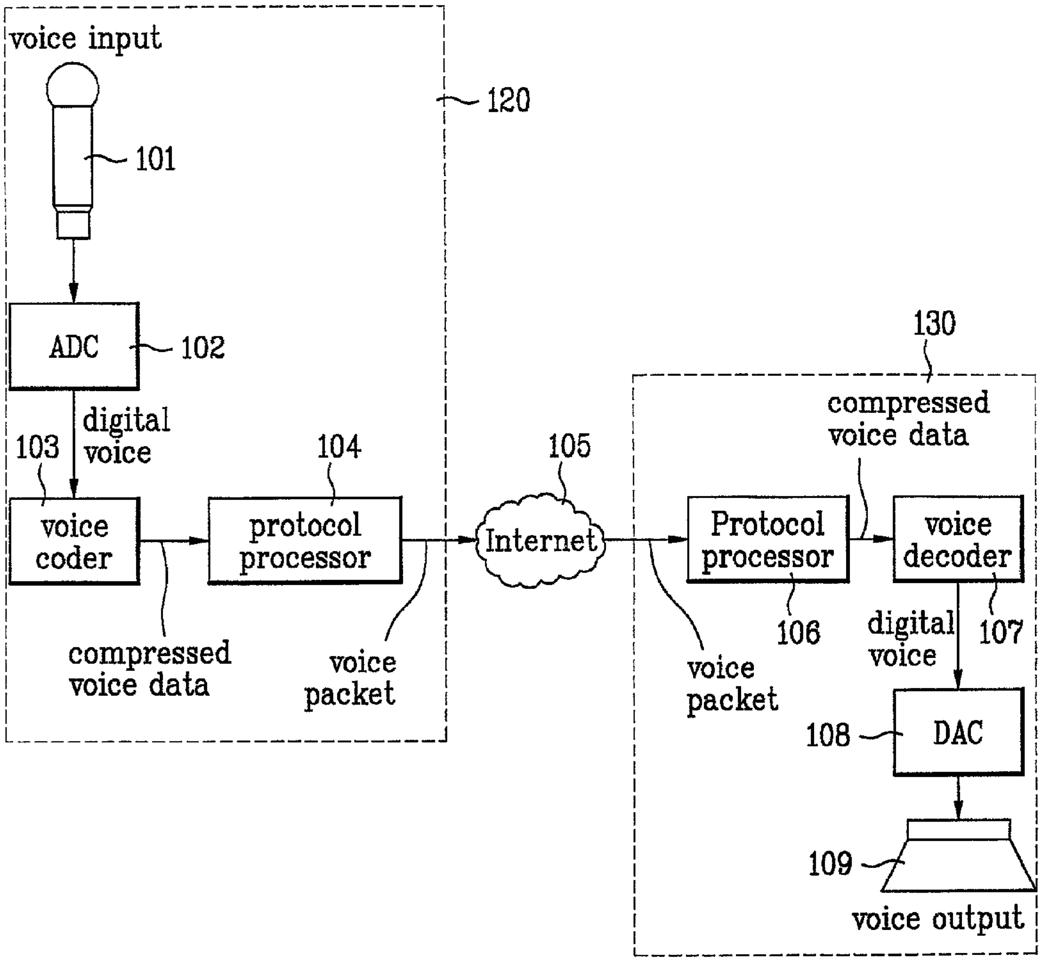
FIG. 1 Related Art
FIG. 1 is a block diagram illustrating the construction of an internet telephone in accordance with the conventional art.
FIG. 2 is a diagram illustrating the format of a voice data packet.

FIG. 2 is a diagram illustrating the format of the voice data packet. Referring to FIG. 2, the format includes an IP header, a UDP header and a plurality of data regions.

The operation of the internet telephone in accordance with the present invention will now be described in detail with reference to FIG. 3.

When the voice of the caller is inputted into the microphone 201, the microphone 201 outputs the analog voice signal. The analog voice signal is converted into a digital voice signal by the analog/digital converter 202.

The digital voice signal outputted from the analog/digital converter 202 is converted into the compressed and encoded data by the voice encoder 203 in order to increase transmission efficiency.

The compressed and encoded voice data is converted into voice data packets to which a header and a trailer are added by the protocol processor 204.

Those voice data packets are transmitted to the internet telephone 230 corresponding to the receiving part via the internet network 205.

Meanwhile, those voice data packets received via the internet network 205 are inputted into the protocol processor of the internet telephone 230 corresponding to the receiving part. The protocol processor 206 removes added information such as the added header and trailer from those voice data packets and extracts only the compressed and encoded voice data. The extracted compressed and encoded voice data is inputted into the data loss decision unit 207.

At this time, the data loss decision unit 207 decides whether the voice data is lost or not in the compressed and encoded voice data. For example, it decides whether there is any damaged portion of the voice data broken due to a communication failure during the transmission of the compressed and encoded voice data via the internet network 205 or whether there is any portion that is so damaged that the voice data cannot be restored due to a problem of a communication line.

Here, the damaged portion includes a level-lowered portion and a noise-interrupted portion.

Whether or not the voice data is lost can be decided by various methods. That is, whether or not the voice data is lost can be decided by detecting whether there is any voice data omitted which must exist in a predetermined sequence in the voice data packet.

In other words, whether the voice data is lost or not can be decided as follows.

As illustrated in FIG. 2, the voice data packet contains a RTP protocol header, the RTP protocol header having a sequence number of each packet attached thereto. Thus, if the sequence number is increased by more than two units, not increased sequentially by one unit, during the receiving of the voice data packet, the data loss decision unit 207 decides that a loss occurs on the packet as much as the increment.

In addition, when the voice data packet is given a threshold, a received section with a level lower than the threshold among sections in the packet can be decided as a lost section. Besides, a variety of methods can be adapted to decide whether the voice data is lost or not.

Meanwhile, the data loss decision unit 207 decides that the lost portion is occurred on the voice data, it generates the position information for the lost portion (or the position information for a waveform blank) and provides the generated position information to the waveform recovery handling unit 209.

Here, the information of the position at which the voice data packet is lost, i.e., the information of the time zone at which a loss occurs, can be extracted from a time stamp information contained in the RTP protocol header. That is, it is possible to estimate the generation time of the next voice data packet from the time stamp of the voice data packet generated prior to the occurrence of the loss and to calculate the occurrence time of the loss based on the above-said generation time.

Hence, the information of the position at which the voice data packet is lost can be known.

Meanwhile, the data loss decision unit 207 delivers the compressed and encoded voice data inputted to the voice decoder 208.

The compressed and encoded voice data is restored to the digital voice signal by the voice decoder 208 and the digital voice signal is delivered to waveform recovery handling unit 209.

The waveform recovery handling unit 209 and the waveform discontinuity processing unit 210 regards the voice data as not lost if the position information is not provided from the data loss decision unit 207, and outputs the digital voice signal inputted from the voice decoder 208 to the digital/analog converter 211 as it is.

The digital voice signal is converted into the analog voice signal by the digital/analog converter 211 and then is outputted as the voice of the caller through the speaker 212.

On the contrary, in the case where the waveform recovery handling unit 209 receives the position information for the lost portion from the data loss decision unit 207, it performs a process for waveform recovery using the position information for the lost portion with respect to the digital voice signal outputted from the voice decoder 208.

FIGS. 4*a* and 4*b* are waveform views illustrating the method for recovering the waveform for the lost portion.

FIG. 4*a* is a diagram illustrating the waveform for the lost portion of the voice data and FIG. 4*b* is a diagram illustrating the waveform of the voice data of which lost portion is recovered.

In FIG. 4*a,* a first voice data packet is normally received, but a second voice data packet and a third voice data packet are lost. The positions of the second and third voice data packets which are the lost portions can be known by the position information.

The waveform recovery handling unit 209 duplicates the voice data of the normally received first voice data packet, and fills the duplicated portion in the portions of the second and third voice data packets having lost waveforms as they are as illustrated in FIG. 3*b*.

As described above, the second and third voice data having recovered waveforms may be similar to the original second and third voice data to a certain extent. The reason of which is because a voice data is closely correlated with voice data positioned next thereto.

In other words, the more a voice data is adjacent to another voice data in time series, the closer the correlation between them is. Thus, although the voice data positioned previous to the voice data of which waveform is lost is directly duplicated and the duplicated voice data is filled in the portion of the voice data of which waveform is lost, it is not so different from the original voice data.

As described above, the digital voice signal of which lost portion is recovered is converted into the analog voice signal by the digital/analog converter 211 to thus be outputted to the speaker 212. The speaker outputs the voice of the caller by using the analog voice signal.

Hence, the voice signal of which lost portion is recovered can be received, and the VOIP speech quality is drastically improved as compared to the conventional art.

Meanwhile, as described above, when the voice data which is not lost and is positioned previous to the voice data of which waveform is lost is duplicated and is filled in the waveform-lost portion, a waveform discontinuity can occur on the boundary surface between the duplicated portion and the original voice data.

In this embodiment, in order to improve the speech quality, the waveform discontinuity handling unit 210 for removing the waveform discontinuity can be provided between the digital/analog converter 211 and the waveform recovery handling unit 209.

Figure 4:
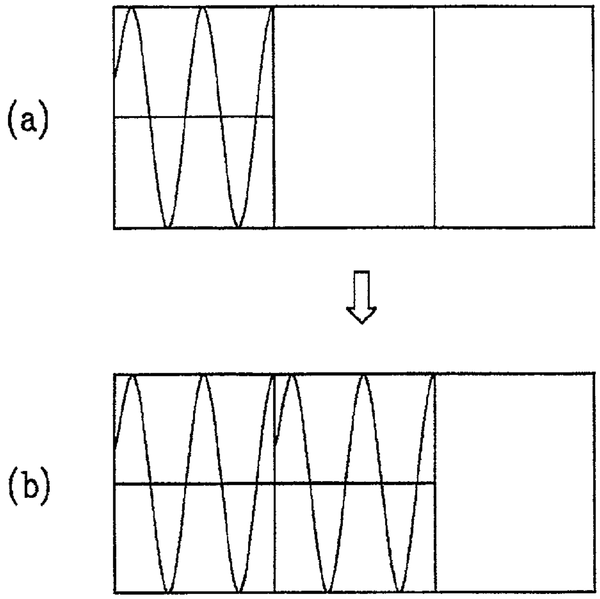
FIG. 4*a* is a waveform view illustrating the loss of voice data.
FIG. 4*b* is a waveform view illustrating the recovery of lost voice data.
Figure 5:
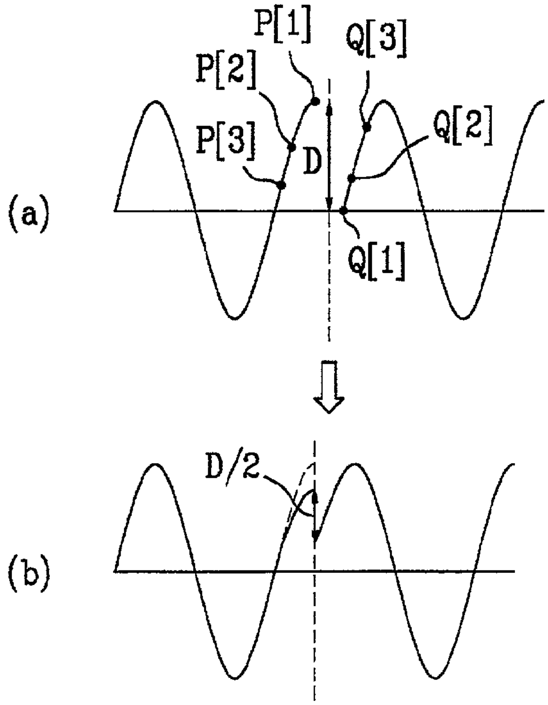
FIG. 5*a* is a waveform view illustrating waveform discontinuity of the recovered voice data.
FIG. 5*b* is a waveform view illustrating the recovered voice data from which the waveform discontinuity is removed.

That is to say, when the waveform recovery handling unit 209 recovers the lost waveform as shown in FIG. 4*a* to the waveform as shown in FIG. 4*b,* the recovered waveform as shown in FIG. 4 can be represented as shown in FIG. 5*a*.

FIG. 5*a* is a waveform view illustrating waveform discontinuity of the recovered voice data. FIG. 5*b* is a waveform view illustrating the recovered voice data from which the waveform discontinuity is removed.

As illustrated in FIG. 5*a,* since the waveform discontinuity occurs on the boundary surface between the original voice data and the duplicated and filled voice data, the waveform discontinuity handling unit 210 readjusts voice data sample values at the corresponding position in order to maintain waveform discontinuity among those voice data.

As described above, the duplicated voice data is filled in the waveform-lost portion based on the position information for the lost portion from the data loss decision unit 207.

For example, in this method, three voice data samples are selected from the voice data respectively previous and next to the discontinuous point and the values of those selected samples are readjusted so that the discontinuity can be removed.

The process of removing the discontinuity by readjusting the values of those samples will now be described.

First, as illustrated in FIG. 5*a,* three voice data samples P[1], P[2] and P[3] are selected from the normally received first voice data positioned in front of the discontinuous section and three voice data samples Q[1], Q[2] and Q[3] are selected from the duplicated voice data positioned at the back of the discontinuous section.

Continually, a difference D between the two samples P[1] and Q[1] most adjacent to the discontinuous point among those selected samples P[1], P[2], P[3] Q[1], Q[2] and Q[3], i.e., a discontinuous distance, is obtained. The values of those 6 voice data samples are readjusted using the thusly obtained discontinuous distance D as follows.

Firstly, sample P[1] is moved toward Q[1] by D/4 and sample Q[1] is moved toward P[1] by D/4. Then, sample P[2] is moved toward Q[1] by D/8 and sample Q[2] is moved toward P[1] by D/8. Then, sample P[3] is moved toward Q[1] by D/16 and sample Q[3] is moved toward P[1] by D/16.

Here, the moving of the samples relatively means that the samples are calculated in the direction of reducing the difference between two values.

In other words, the difference between the sample values of the original data and the duplicated data which are most adjacent to the discontinuous point is obtained as a discontinuous distance D, and at least one sample positioned most adjacent to the discontinuous point is selected from those samples of the original data and duplicated data.

Continuously, the value of the at least one sample selected is readjusted by values (D/4, D/8 and D/16) obtained by adapting weight values (¼, ⅛ and 1/16) appropriate as the discontinuous distance D. Hence, the waveform discontinuity can be removed.

As seen from above, the original voice data and duplicated voice data which are most adjacent to the discontinuous point can be connected, and the discontinuous waveform as shown in FIG. 5*a* can be corrected to the waveform of a smoothly connected form as shown in FIG. 5*b*.

In this way, since the waveform discontinuity is removed from the thusly corrected digital voice data, an improved speech quality can be maintained when the digital voice data is finally converted into the analog voice signal.

The present invention has the following advantages.

First, the internet telephone of the present invention can improve the speech quality of the VOIP by recovering and correcting a lost voice data during transmission by using new elements.

Second, since the technique of improving the VOIP speech quality is implemented by performing waveform recovery and waveform correction at the receiving part, the speech quality can be improved without increasing the channel capacity of the entire communication network.

The foregoing embodiments and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An internet telephone comprising:

a data loss decision unit for deciding whether there is a voice data lost in the voice data packet received via the internet network and outputting the position information for the lost portion of the voice data; and a waveform recovery unit for duplicating a voice data normally received previously to the lost portion and filling the same in the lost portion of the voice data according to the position information, wherein the data loss decision unit decides a received section of the voice data packet is lost, when the level of the received section is lower than a predetermined threshold.

2. The internet telephone of claim 1, the data loss decision unit decides whether the voice data is lost or not by detecting whether the voice data is omitted from the portions at which voice data must exist in a predetermined sequence in the voice data packet.

3. The internet telephone of claim 1, wherein the voice data that is duplicated and filled in the lost portion is a normal voice data received previously to the voice data corresponding to the lost portion.

4. An internet telephone comprising:

data loss decision unit for deciding whether there is a voice data lost in the voice data packet received via the internet network and outputting the position information for the lost portion of the voice data; and a waveform recovery unit for duplicating a voice data normally received previously to the lost portion and filling the same in the lost portion of the voice data according to the position information wherein the internet telephone further comprises a waveform discontinuity handling unit for removing the discontinuity between the originally received voice data and the duplicated and filled voice data from the output signal of the waveform recovery unit.

5. The internet telephone of claim 4, wherein the waveform discontinuity handling unit measures a discontinuous distance D using the position information for the lost portion and readjusts the values of at least one voice data sample of the voice data positioned previous to the discontinuous distance and the values of at least one voice data sample of the voice data positioned next to the discontinuous distance so that the discontinuous distance can be reduced.

6. The internet telephone of claim 5, wherein the waveform discontinuity handling unit readjusts the values of at least one sample selected by adjustment values obtained by adapting weight values appropriate as the discontinuous distance D.

7. The internet telephone of claim 6, wherein those adjustment values are obtained by dividing the discontinuous distance D by 2n (n=1,2,3, . . . ) values.

8. The internet telephone of claim 7, wherein, when n is 1, 2 and 3, three voice data samples P[1], P[2] and P[3] are selected as samples of the voice data positioned previous to the discontinuous distance D and three voice data samples Q[1], Q[2] and Q[3] are selected as samples of the voice data positioned next to the discontinuous distance;

sample P[1] is moved toward Q[1] by D/4 and sample Q[1] is moved toward P[1] by D/4;

sample P[2] is moved toward Q[1] by D/8 and sample Q[2] is moved toward P[1] by D/8; and sample P[3] is moved toward Q[1] by D/16 and sample Q[3] is moved toward P[1] by D/16.

9. An internet telephone, comprising:
a protocol processor for separating the compressed and encoded voice data from the voice data packet transmitted via the internet network;
a data loss decision unit for deciding whether the voice data is lost or not by analyzing the compressed and encoded data and for outputting the position information for the lost portion of the voice data if the voice data is lost;
a voice decoder for restoring the compressed and encoded voice data having passed the data loss decision unit to the digital voice data;
a waveform recovery handing unit for performing waveform recovery for the lost portion by filling the duplicated previous normal voice data in the lost portion of the restored digital voice data based on the position information;
a waveform discontinuity handling unit for removing waveform discontinuity between the original voice data and the duplicated previous normal voice data in the recovered voice data;
a digital/analog converter(DAC) for converting the digital voice signal outputted from the waveform discontinuity handling unit into the analog voice signal; and
a speaker for inputting the analog voice signal and outputting the voice of the caller.

10. The internet telephone of claim 9, wherein the data loss decision unit decides a received section with a level lower than a given threshold among sections in the voice data packet as a lost section.

11. The internet telephone of claim 9, wherein the voice data that is duplicated and filled in the lost portion is a normal voice data received previously to the voice data corresponding to the lost portion.

12. The internet telephone of claim 9, wherein the waveform discontinuity handling unit measures a discontinuous distance D using the position information for the lost portion and readjusts the values of at least one voice data sample of the voice data positioned previous to the discontinuous distance and the values of at least one voice data sample of the voice data positioned next to the discontinuous distance so that the discontinuous distance can be reduced.

13. The internet telephone of claim 12, wherein the waveform discontinuity handling unit readjusts the values of at least one sample selected by adjustment values obtained by adapting weight values appropriate as the discontinuous distance D.

14. The internet telephone of claim 13, wherein those adjustment values are obtained by dividing the discontinuous distance D by 2n (n=1,2,3, . . . ) values.

15. A method for recovering voice data lost in an internet telephone, the method comprising the steps of:
deciding whether a voice data is lost and obtaining the position information for a lost portion of the voice data by analyzing a voice data packet received via the internet network;
duplicating a normal data received previously to the lost portion;
filling the duplicated normal voice data in the lost portion in the voice data based on the position information in order to recover the voice data; and
removing waveform discontinuity between the original voice data and the duplicated previous normal voice data in the recovered voice data.

16. The method of claim 15, wherein, in the step of deciding whether the voice data is lost, a received section with a level lower than a given threshold is decided as a lost portion among sections in the voice data packet.

17. The method of claim 15, wherein, in the step of deciding whether the voice data is lost, whether the voice data is lost or not is decided by detecting whether the voice data is omitted from the portions at which voice data must exist in a predetermined sequence in the voice data packet.

18. The method of claim 15, wherein the step of removing waveform discontinuity comprises the steps of:
measuring a discontinuous distance D by using the position information;
selecting the values of at least one voice data sample of the voice data positioned previous to the discontinuous distance and the values of at least one voice data sample of the voice data positioned next to the discontinuous distance; and
readjusting the value of the selected samples so that the discontinuous distance can be reduced.

19. The method of claim 18, wherein the values of at least one sample selected are readjusted by adjustment values obtained by adapting weight values appropriate as the discontinuous distance D.

20. The method of claim 19, wherein those adjustment values are obtained by dividing the discontinuous distance D by 2n (n=1,2,3, . . . ) values.

* * * * *